(12) United States Patent
Yamana et al.

(10) Patent No.: US 7,551,227 B2
(45) Date of Patent: Jun. 23, 2009

(54) SIGNAL PROCESSOR

(75) Inventors: Akifumi Yamana, Hyogo (JP); Ryouji Yamaguchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1042 days.

(21) Appl. No.: 10/940,765

(22) Filed: Sep. 15, 2004

(65) Prior Publication Data
US 2005/0169532 A1    Aug. 4, 2005

(30) Foreign Application Priority Data
Jan. 16, 2004   (JP) .............................. 2004-009793

(51) Int. Cl.
*H04N 9/475* (2006.01)
(52) U.S. Cl. ...................... 348/515; 348/500; 348/512; 348/516
(58) Field of Classification Search ................. 348/515, 348/512, 518, 500, 523, 738, 423.5, 425.4, 348/462, 464, 468, 497, 471, 473; 375/240.25, 375/240.28, 355; 386/71, 75, 84–85, 96; *H04N 9/475*
See application file for complete search history.

(56) References Cited

U.S. PATENT DOCUMENTS

| | | | |
|---|---|---|---|
| 5,537,148 A | | 7/1996 | Fujinami |
| 5,598,352 A | * | 1/1997 | Rosenau et al. ............. 715/203 |
| 5,899,578 A | * | 5/1999 | Yanagihara et al. ........... 386/75 |
| 6,148,135 A | | 11/2000 | Suzuki |
| 6,311,161 B1 | * | 10/2001 | Anderson et al. ........... 704/500 |
| 6,356,312 B1 | | 3/2002 | Lyu |
| 6,516,005 B1 | | 2/2003 | Murayama et al. |
| 7,212,247 B2 | * | 5/2007 | Albean ....................... 348/515 |

FOREIGN PATENT DOCUMENTS

| | | |
|---|---|---|
| CN | 1292197 A | 4/2001 |
| JP | 2001-506450 | 5/2001 |
| WO | WO 98/27729 | 6/1998 |
| WO | WO 99/35824 | 7/1999 |

OTHER PUBLICATIONS

EP 04 02 0160; European Patent Office Search Report; Mar. 14, 2005.
Chinese Office Action in corresponding Chinese Patent Application No. CN 2004100816942, dated Oct. 27, 2006.

* cited by examiner

*Primary Examiner*—Trang U Tran
(74) *Attorney, Agent, or Firm*—McDermott Will & Emery LLP

(57) ABSTRACT

A signal processor includes a picture input section for receiving a video bit stream, a video decoding section for decoding the video bit stream, a picture display section for outputting decoded data from the video decoding section, a digital image input section for receiving digital image data, a digital image display section for outputting the digital image data, a blending section for generating a picture signal from the digital image display section and the picture display section, an audio input section for receiving the digital audio data and the audio bit stream, an audio decoding section for decoding audio data and the audio bit stream, an audio output section for adding an audio signal to data from the audio decoding section to generate a signal and outputting the generated signal, and a synchronizing section for synchronizing respective outputs of the blending section and the audio output section.

4 Claims, 10 Drawing Sheets

SIGNAL PROCESSOR

CROSS-REFERENCE TO RELATED APPLICATION

This application claims priority under 35 U.S.C. §119(a) on Japanese Patent Application No. 2004-9793 filed on Jan. 16, 2004, the entire contents of which are hereby incorporated by reference.

BACKGROUND OF THE INVENTION

The present invention relates to a signal processing technique for decoding/outputting an encoded bit stream and outputting a digital signal.

When decoding/outputting of an encoded bit stream and outputting of a digital signal is performed, for example, processing such as decoding and outputting are performed by a signal processor shown in FIG. 10.

FIG. 10 is a block diagram illustrating a known signal processor. As shown in FIG. 10, in the known signal processor, a video bit stream (referred to as "video stream" for short in FIG. 10), i.e., encoded picture data is received by a picture input section 2001, external data, i.e., analog data or digital data is received by an external data buffer 2005. The video bit stream received by the picture input section 2001 is temporarily held by a video stream buffer 2002, decoded by a video decoding section 2003 and then displayed on a picture display section 2004. Next, the video bit stream is output from the picture display section 2004 to a blending section 2006. Moreover, the external data received by the external data buffer 2005 is also output to the blending section 2006. In the blending section 2006, then, the decoded video bit stream and the external data are synchronized with each other and displayed. Note that as the external data, for example, data in accordance with the BT 656 standard is used.

On the other hand, the audio bit stream is received by an audio input section 2008 and PCM (pulse code modulation) audio data corresponding to external data is received by an audio buffer 2012. An audio bit stream is temporarily held by an audio stream buffer 2009 and then decoded by the audio decoding section 2010. Thereafter, a sound is output from an audio output section 2011. Moreover, the audio data received by the audio buffer 2012 is output as an audio output from an audio output section 2013.

Moreover, it normally requires a longer time to decode the video bit stream than it does to decode the audio bit stream. Therefore, in the known signal processor, a synthesizing section 2007 is provided so that a display of the video bit stream and an audio output of the audio stream are synchronized with each other. However, in a known technique, processing is performed without synthesizing the external data and the audio data. An example of such signal processors is disclosed in Japanese Laid-Open Publication 2001-506450.

SUMMARY OF THE INVENTION

However, in the known signal processor, the number of processing stages for processing external data is different from that for processing a video bit stream and, therefore, there are cases where a picture display of the external data and a picture display of the video bit stream are not synchronized. In the same manner, the number of processing stages for processing a audio bit stream is different from the number of processing stages for processing audio data and there are cases where an audio output of the audio bit stream and an audio output of the audio data are not synchronized. Moreover, there are also cases where a display of the external data and an output of a sound corresponding to the external data are not synchronized. Therefore, a difference between a display time for a picture and an output time of the sound corresponding to the picture may be caused. The difference has been a cause for discomfort to a user.

It is therefore an object of the present invention to provide a signal processor which allows synchronization of a digital picture output and a digital audio output with each other.

A first signal processor according to the present invention includes: a digital input section for separately receiving an encoded video bit stream, digital image data, an encoded audio bit stream and digital audio data; a data buffer capable of holding the encoded video bit stream, the digital image data, the encoded audio bit stream and the digital audio data, each being separately output from the digital input section; a decoding section including a video decoding section for receiving the encoded video bit stream held in the data buffer and outputting the decoded video bit stream and an audio decoding section for receiving the digital audio data and the encoded audio bit stream and outputting the digital audio data and the decoded audio bit stream; and a synthesizing section for controlling an operation of the audio decoding section to synchronize an output of the encoded audio bit stream, an output of the digital audio data and a display of the digital image data.

With this configuration, the synchronizing section controls the operation of the audio decoding section such as decoding and outputting of the digital audio data, so that a digital picture output and a digital audio output can be synchronized. Accordingly, a TV, a DVD player and the like which do not cause discomfort to a user when the user looks at or listen to them can be achieved. Note that the operation of each member of the signal processor according to the present invention can be performed by a CPU using a computer readable program.

Moreover, the synchronizing section delays a start of decoding in the audio decoding section, thereby synchronizing the output of the encoded audio bit stream, the output of the digital audio data and a display of the digital image data. Thus, synchronization between a digital image output and a digital audio output, which has been difficult with a known technique, can be achieved. Furthermore, the output of the audio bit stream and the output of the video bit stream can be also synchronized. This is because it normally takes a longer time to process the video bit stream or the digital image data than it does to process the audio bit stream or the audio data.

It is preferable that the signal processor further includes an output section including a picture display section for receiving the decoded video bit stream and outputting the decoded video bit stream as display data, a digital image display section for receiving the digital image data held in the data buffer and outputting the digital image data as display data, and an audio output section for outputting the decoded audio bit stream and the digital audio data, and the synchronizing section synchronizes an output of the digital image display section and an output of the audio output section. Moreover, the digital image display section is added to the route of processing of the digital image data, so that processing such as enlargement and reduction of the size of an image can be performed.

The digital input section includes a picture input section for receiving the encoded video bit stream and a digital image input section for receiving the digital image data, and the synchronizing section includes an input detection section for detecting an input of the digital image data into the digital image input section, a counter section for counting an elapsed time from a time at which the input detection section detects the input of the digital image data, a first input/output total time section for holding a time difference between a first total time, i.e., a required total time from a time at which the digital image data is received by the digital image input section to a time at which the digital image data is output from the digital image display section and a second total time, i.e., a required total time from a time at which the digital audio data is received by the audio decoding section to a time at which the digital audio data is output from the audio output section, and a first comparison section for making, if the time difference between the first and second total times and a count value of the counter section are judged equal to each other, the audio decoding section start decoding of the audio bit stream. Thus, at least the output of the digital image data and the output of the digital audio data can be synchronized with accuracy, for example, in processing in a TV and a DVD player in which the first and second total times can be specified beforehand.

It is preferable that if an absolute value of a difference between the time difference between the first and second total times and the counter value of the counter section is 1/60 seconds or smaller, the first comparison section makes the audio decoding section start decoding of the audio bit stream.

The audio decoding section does not output the digital audio data received by the audio input section to the audio output section until decoding is started according to an instruction from the first comparison section. Thus, the output of the digital image data and the output of the digital audio data can be synchronized with accuracy.

Moreover, the audio input section does not output the digital audio data to the audio output section until the first comparison section gives an instruction for starting decoding. Thus, the output of the digital image data and the output of the digital audio data can be synchronized with accuracy.

The digital input section includes an audio input section for receiving the audio bit stream and the digital audio data, and the data buffer includes an audio stream buffer for holding the digital audio data received by the audio input section. Thus, the audio bit stream and the digital audio data can be processed in the same circuit, so that a circuit area can be reduced, compared to a known signal processor in which the audio bit stream and the digital audio data are separately processed in different circuits.

The digital input section includes a picture input section for receiving the encoded video bit stream, a digital image input section for receiving the digital image data and an audio input section for receiving the audio bit stream and the digital audio data, and the synchronizing section includes a system time clock counter for generating a time, a second input/output total time section for holding a third total time, i.e., a processing time from a time at which the encoded video bit stream is received by the picture input section to a time at which the decoded video bit stream is output from the picture display section, and an adding section for giving an instruction for inserting as picture time information a value obtained by adding the third total time output from the second input/output total time section into the time generated by the system clock counter while giving an instruction for inserting as audio time information the value into the digital audio data.

Thus, for example, by detecting the picture time information inserted into the digital image data and the audio time information inserted into the digital audio data, the output of the digital image data and the output of the digital audio data can be synchronized and the outputs of the data and a display of the decoded audio bit stream can be synchronized.

The synchronizing section further includes a VTC detection section for detecting the picture time information of the digital image data from the data buffer, an ATC detection section for detecting the audio time information of the digital audio data from the data buffer, a second comparison section for giving the digital image display section an instruction for outputting the digital image data if a difference between an output value of the system time clock counter and the picture time information detected in the VTC detection section is smaller than a threshold while giving the audio decoding section an instruction for outputting the digital audio data if a difference between the output value of the system time clock counter and the audio time information detected in the ATC detection section is smaller than a threshold. Thus, the processing of each of the digital image data, the audio bit stream and the digital audio data can be delayed according to a processing time of the video bit stream, so that the respective outputs of the digital image data, the audio bit stream and the digital audio data can be synchronized with the output of the decoded video bit stream. Specifically, processing in the digital image display section located to closer to an output section of the signal processor can be delayed. Therefore, synchronization can be performed with higher accuracy, compared to the case in which only the operations of the video decoding section and the audio decoding section are controlled.

If the difference between the output value of the system time clock counter and the picture time information detected in the VTC detection section is the threshold or larger, the second comparison section gives the digital image display section an instruction for outputting the digital image data in a previous field or frame. Thus, even when synchronization is not performed, a display of a distorted digital image can be prevented.

The adding section performs insertion of the picture time information in each vertical synchronizing signal interval of the digital image data. Thus, when the digital image data and the digital audio data are from a TV, a DVD or the like, outputs of data can be synchronized in a more simple manner.

The adding section performs insertion of the audio time information in each frame interval of the digital audio data. Thus, outputs of data can be synchronized in a more simple manner.

The signal processor further includes a selector for selecting, if a plurality of types of the digital audio data are received, one of the plurality of types of the digital audio data and inputting the selected data to the digital input section. Thus, a circuit area can be reduced.

It is preferable that the digital image data output from the digital image display section is synchronized with a vertical synchronizing signal or a horizontal synchronizing signal.

The digital audio data received by the digital input section before the audio decoding section starts decoding of the encoded audio bit stream is deleted from the data buffer. Thus, the storage capacity of the data buffer can be reduced, so that a circuit area can be reduced.

Inputting of the digital audio data and the encoded audio bit stream to the data buffer is stopped until decoding of the encoded video bit stream in the video decoding section is completed. Thus, the storage capacity of the data buffer can be reduced, so that a circuit area can be reduced.

A second signal processor according to the present invention includes: a digital input section for separately receiving an encoded video bit stream, digital image data, an encoded audio bit stream and digital audio data; a data buffer capable of separately holding the encoded video bit stream, the digital image data, the encoded audio bit stream and the digital audio data, each being separately output from the digital input section; a decoding section including a video decoding section for receiving the encoded video bit stream held in the data buffer and outputting the decoded video bit stream and an audio decoding section for receiving the encoded audio bit stream and outputting the decoded audio bit stream; an output section for receiving an output of the decoding section and outputting the decoded audio bit stream, the digital image data, the decoded audio bit stream and the digital audio data; and a synchronizing section, the digital input section includes an audio input section for receiving the encoded audio bit stream and the digital audio data, the data buffer includes an audio stream buffer for holding the encoded audio bit stream and the digital audio data which have been received by the audio input section, the decoding section includes an audio decoding section for receiving the digital audio data and the encoded audio bit stream and outputting the digital audio data and the encoded audio bit stream, and the output section includes an audio output section for receiving an output from the audio decoding section and outputting the digital audio data and the encoded audio bit stream.

Thus, the audio bit stream and the digital audio data can be processed in the same circuit, so that the area of a processing circuit for processing the audio data can be reduced. Therefore, the area of the signal processor itself can be reduced.

DESCRIPTION OF THE PREFERRED EMBODIMENTS

Hereinafter, detailed description of the present invention will be given with reference to the accompanying drawings.

First Embodiment

Figure 1:
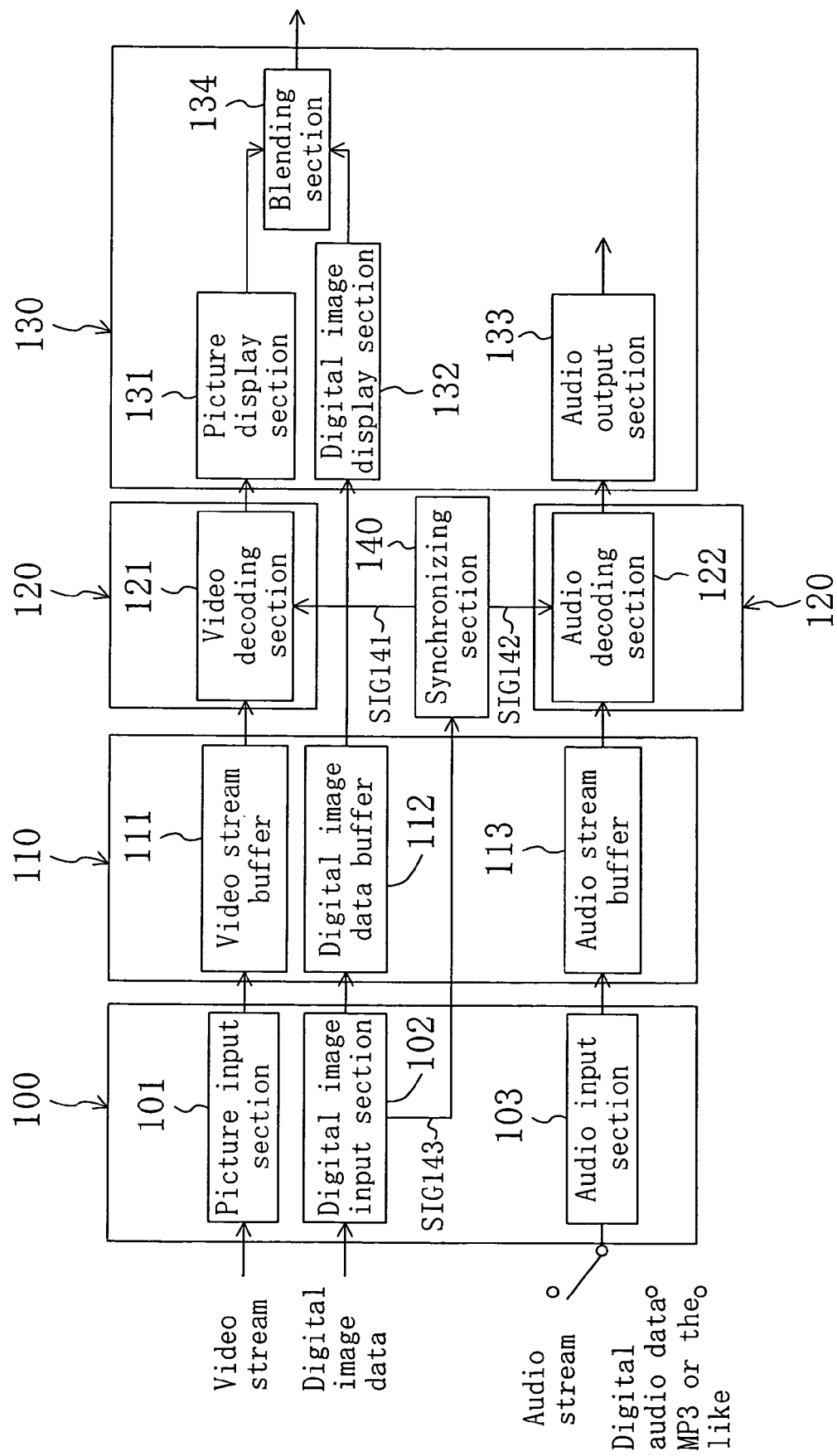
FIG. 1 is a block diagram illustrating a signal processor according to a first embodiment of the present invention.

FIG. 1 is a block diagram illustrating a signal processor according to a first embodiment of the present invention.

As shown in FIG. 1, the signal processor of this embodiment includes a digital input section 100 for receiving picture (image) and audio data, a data buffer 110 for holding each input data received by the digital input section 100, a decoding section 120 for decoding encoded picture data and encoded audio data, an output section 130 and a synchronizing section 140.

The digital input section 100 includes an image input section 101 for receiving an encoded video bit stream, a digital image input section 102 for receiving digital image data transmitted from an analog TV, a DVD player, a network or the like, and an audio input section 103 for receiving an encoded audio bit stream and digital audio data transmitted from an analog TV, a DVD player, an AVHDD, a network or the like. Moreover, the digital image input section 102 outputs, when digital image data is received, a signal SIG143 indicating that digital image data has been received to the synthesizing section 140. Note that a selector for selecting one of the digital audio data and the audio bit stream and outputting the selected one to the audio input section 103 may be provided in the previous stage of the digital input section 100. In that case, with the selector provided, the circuit area of the signal processor can be reduced.

The data buffer 110 includes a video stream buffer 111 for temporarily holding an audio bit stream output from the audio input section 101, a digital image data buffer 112 for temporarily holding a digital image data output from the digital image input section 102, and an audio stream buffer 113 for temporarily holding an audio bit stream and digital audio data output from the audio input section 103.

Moreover, the decoding section 120 includes a video decoding section 121 for decoding an encoded video bit stream and an audio decoding section 122 for decoding an encoded audio bit stream. Decoding of the video bit stream in the video decoding section 121 and decoding of the audio video bit stream in the audio decoding section 122 are started according to instructions SIG141 and SIG142 from the synchronizing section 140, respectively.

The output section 130 includes a picture display section 131 for receiving a decoded video bit stream from the video decoding section 121, a digital image display section 132, an audio output section 133 and blending section 134. Of these, the picture display section 131 synchronizes data of an input picture with a vertical synchronizing signal or a horizontal synchronizing signal and then outputs the data as displayable data on a display or the like. Moreover, the digital image display section 132 can also perform filtering of digital image data and other processing such as enlargement or reduction in the size of an image. The audio output section 133 outputs audio data decoded by the audio decoding section 122. It is one of features of the signal processor of this embodiment that the digital image display section 132 is provided. The blending section 134 synchronizes an output of the picture display section 131 and an output of the digital image display section 132, synchronizes the synchronized output with a horizontal periodic signal and then outputs it as a picture.

Moreover, to synchronize processing of picture data and processing of audio data, the synchronizing section 140 gives the video decoding section an instruction (SIG141) for starting decoding and gives the audio decoding section an instruction (SIG142) for starting decoding.

With the above-described structure, a data flow input in the signal processor of this embodiment is as follows.

The video bit stream received by the picture input section 101 is output from the picture input section 101 to the video stream buffer 111 and then to the video decoding section 121. Subsequently, the video bit stream is decoded by the video decoding section 121 and output to the picture display section 131 as picture data. Then, the decoded video bit stream is synchronized with a vertical synchronizing signal or a horizontal synchronizing signal by the picture display section 131 and then output to the blending section 134.

The digital image data received by the digital image input section 102 is output to the digital image data buffer 112 and then output to the digital image display section 132. Subsequently, the digital image data received by the digital image display section 132 is synchronized with the vertical synchronizing signal or the horizontal synchronizing signal and then received by the blending section 134. In the blending section 134, the synchronized digital image data and the decoded and synchronized picture data are synchronized. Then, the blending section 134 synchronizes the synchronized picture with the horizontal synchronizing signal and outputs it.

Moreover, the audio bit stream and the digital audio data are received by the audio input section 103, output to the audio stream buffer 113 and then output to the audio decoding section 122. Subsequently, the audio bit stream is decoded by the audio decoding section 122 and then output as audio data to the audio output section 133. Moreover, the digital audio data is output from the audio decoding section 122 to the audio output section. As has been described, the audio bit stream and the digital audio data are received by the same audio input section 103. This is one of differences of the signal processor of this embodiment from the known signal processor. Thus, in the signal processor of this embodiment, the circuit area can be reduced, compared to the known signal processor.

Moreover, in the signal processor of this embodiment, when the digital image data is received by the digital image input section 102, the signal SIG143 is sent from the digital image input section 102 to the synchronizing section 140. Then, the synchronizing section 140 outputs, based on the signal SIG143, the instruction SIG141 for starting decoding of the video bit stream in the video decoding section 121 and the instruction SIG142 for starting decoding of the audio bit stream in the audio decoding section 122.

Next, synchronization in the signal processor of this embodiment will be described.

Figure 2:
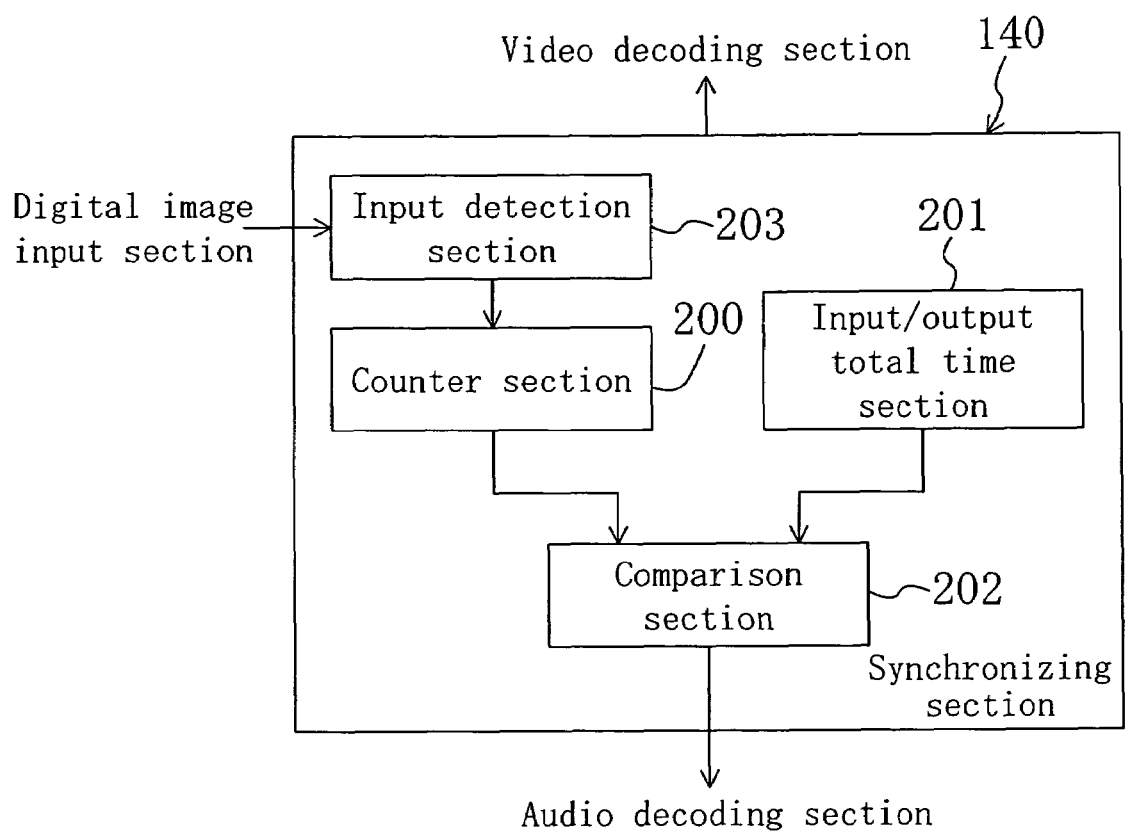
FIG. 2 is a block diagram illustrating the synchronizing section in the signal processor of the first embodiment.

FIG. 2 is a block diagram illustrating the synchronizing section in the signal processor of this embodiment. As shown in FIG. 2, the synchronizing section 140 includes an input detection section 203, a counter section 200, an input/output total time section (first input/output total time section) 201 and a comparison section (first comparison section) 202.

When the digital image data is received by the digital image input section 102 and an initial vertical synchronizing signal contained in the digital image data is generated, the digital image input section 102 outputs a signal SIG143 to the input detection section 203. In response to the signal SIG143, the input detection section 203 detects an input of the digital image data and zero initializes the counter section 200 when the initial vertical synchronizing signal is received. The counter section 200 counts up every certain time interval (for example, every display line) and outputs a counter value to the comparison section 202. The input/output total time section 201 holds a time difference between a total time from a time at which digital image data is received by the digital image input section 102 to a time at which the digital image data is output by the digital image display section 132 (referred to as a "total time A") and a total time from a time at which digital audio data is received by the audio decoding section 122 to a time at which the audio data is output by the audio output section 133 (referred to as a "total time B") and the time difference, i.e., (the total time A−the total time B) is output to the comparison section 202. In this case, when the digital image data and the digital audio data are TV data or DVD data, a time for data processing is specified beforehand and the total time A and the total time B are also specified. The comparison section 202 compares an output value (time difference) from the input/output total time section 201 and an output value from the counter section 200 with each other. Specifically, if the output value from the input/output total time section 201 and the output value from the counter section 200 can be assumed to be equal to each other, the comparison section 202 sends to the audio decoding section 122 an instruction SIG142 for starting decoding. It takes a longer time to process the digital image and the video bit stream than it does to process the digital audio data. Therefore, as has been described, by delaying decoding in the audio decoding section 122, processing of the digital image data and processing of the digital audio data can be synchronized with each other. Moreover, synchronization of processing of the video bit stream and processing of the digital image data with each other is controlled by SIG141.

Figure 5:
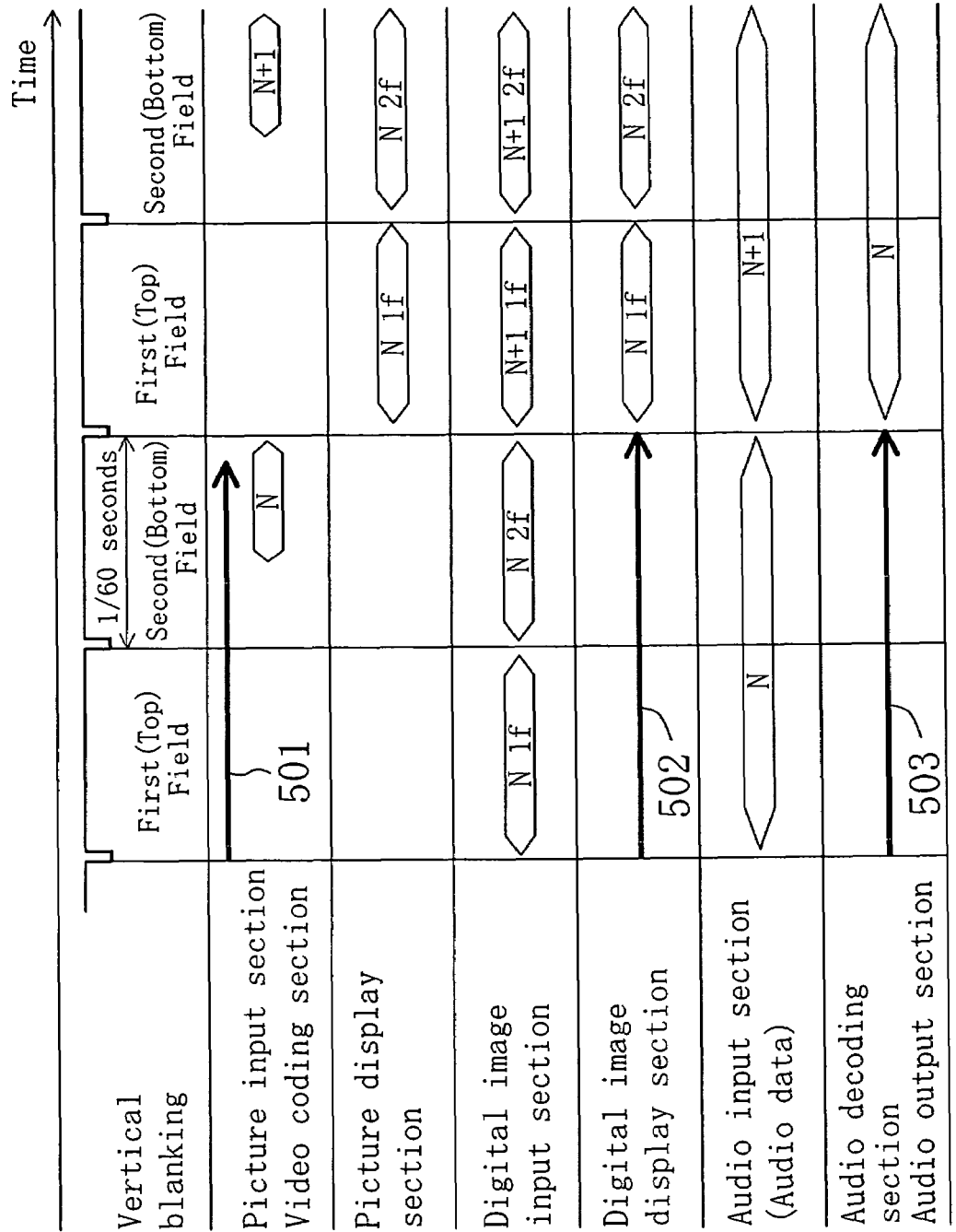
FIG. 5 is a timing chart showing an example of the respective operations of members of a signal processor according to the present invention.

Next, processing performed in the synchronizing section 140 will be described using specific numerical values. FIG. 5 is a timing chart showing an example of the respective operations of members of the signal processor of this embodiment.

First, if it is assumed that a processing time 501 from a time at which digital image data is received by the digital image input section 102 to a time at which the digital image data is output from the digital image display section 132 is 2/60 seconds and a time from a time at which the digital audio data is received by the audio decoding section 122 to a time at which the digital audio data is output as an audio output by the audio output section 133 is about 0, 2/60 (sec)−0 (sec)=2/60 (sec) holds. Accordingly, the synchronizing section 140 delays a start of decoding of the audio decoding section 122 by an amount corresponding to 2/60 seconds. In that case, a value of 2/60 seconds is held in the input/output total time section 201.

In this state, when the digital image data is received by the digital input section 102, the input detection section 203 judges, at a time when the initial vertical synchronizing signal is detected, that the digital image data is received, and then zero initialization of the counter section 200 is performed. Then, the counter section 200 starts post-initialization count up. Furthermore, when the output value of the input/output total time section 201 and the output value of the counter section 200 become equal to each other, the synchronizing section 140 sends to the audio decoding section 122 the instruction SIG142 for starting decoding. In this case, if (the absolute value of) a difference between the output value of the input/output total time section 201 and the output value of the counter section 200 is 1/60 seconds or smaller, it is judged that the outputs are equal.

Next, when the audio decoding section 122 starts decoding of the audio bit stream, the decoding is started with the beginning of the audio bit stream held in the audio stream buffer 113. Moreover, until decoding is started, the synchronizing section 140 performs an operation according to the instruction SIG142 for stopping audio output. Moreover, the digital audio data before starting decoding is deleted by the audio input section 103. Thus, the storage capacity of the audio stream buffer 113 can be reduced, thus resulting in reduction in the size of a circuit of the signal processor.

Next, the operation of the signal processing section will be described using a time chart shown in FIG. 5. In FIG. 5, a subject to be processed is referred to as, for example, "N_1f" and the like. Hereinafter, as notation for each processing, each of "N", "N+1" and the like represents the number of a subject frame to be processed (where N is an integer). Moreover, "1f" and "2f" indicate processings for a first field and a second field, respectively.

In the time chart of FIG. 5, the video bit stream is received by the picture input section 101, the digital image data is received by the digital image input section 102 and the digital audio data is received by the audio input section 103. Note that a period of a field, i.e., a vertical synchronizing period is 1/60 seconds.

As shown in FIG. 5, in the signal processor of this embodiment, Nth encoded data obtained in the picture input section 101 and that of the audio input section 103 are received at the same timing, and the digital image data and the digital audio data obtained in the digital image input section 102 are received at the same timing. Of these data, the Nth video bit stream is stored in the video stream buffer 111. Thereafter, with the video decoding section 121 synchronized with the vertical synchronizing signal, decoding of the Nth video bit stream is started in the second field. Next, the picture display section 131 is synchronized with a next vertical synchronizing signal in a period in which decoding of the Nth video bit stream is started and outputs the decoded video bit stream by the video decoding section 121 to the first field and the second field. Thus, it requires a processing time 501 of 2/60 second to input the video bit stream in the video input section 101 and then to output the video bit stream to the picture display section 131.

On the other hand, an output from the digital image display section 132 and an output from the audio output section 133 are synchronized with the output timing of the picture display section 131. Therefore, delay control is performed so that a delay of 2/60 seconds is made. Specifically, processing in the digital image display section 132 was delayed by 2/60 seconds by the synchronizing section 140.

Moreover, the processing time 503 which it takes to process the audio decoding section 122 to the audio output section 133 includes a time of 2/60 seconds, i.e., the time by which an operation of the audio decoding section 122 is delayed by the synchronizing section 140. By the above-described processing, in the signal processor of this embodiment, the output from the picture display section 131, the output from the digital image display section 132 and the output from the audio output section 133 can be synchronized with each other.

As has been described, with the signal processor of this embodiment, an operation of the audio decoding section 122 is delayed by the synchronizing section 140 according to a time by which the processing of the digital image data is delayed from the processing of the digital audio data. Therefore, a display of the digital image data and an output of the digital audio data corresponding to the display can be synchronized with each other. Moreover, the synchronizing section 140 controls a start of decoding of the video decoding section 121, so that the output of the picture display section 131 can be synchronized with the output of the digital image display section 132. As a result, for example, when information held in a DVD, an AVHDD or the like is reproduced, it is possible to make a user to look at and listen to the reproduced information without giving discomfort to the user.

Moreover, with the signal processor of this embodiment, the digital image display section 132 is provided in a route of processing of the digital image data. Thus, filtering of the digital image data and processing such as enlargement and reduction of an image is possible. In addition, the digital image display section 132 synchronizes the digital image data with the vertical synchronizing signal or the horizontal synchronizing signal. Thus, when the digital image data from a TV, a DVD player or a hard disk, an image and a sound can be well synchronized in each frame. However, in the digital image display section 132, the digital image data may be synchronized with some other signal than the vertical synchronizing signal and the horizontal synchronizing signal.

Furthermore, with the signal processor of this embodiment, each of the audio bit stream and the digital audio data passes the same processing route. Thus, a circuit area can be reduced, compared to the case where the audio bit stream and the digital audio data pass different processing routes.

Moreover, with the signal processor of this embodiment, the digital audio data which has been input before decoding in the audio decoding section 122 is started is deleted, so that a memory of the audio stream buffer 313 can be deleted, Therefore, costs can be cut down.

Note that with the signal processor of this embodiment, the total time A and the total time B are held in the input/output total time section 201 beforehand. However, an actually measured processing time may be used as each of the total time A and the total time B. Thus, even when the total time A and the total time B are not known, the image data and the audio data can be synchronized.

Moreover, the operation of each member of the signal processor of this embodiment can be achieved by operating a central processing unit (CPU) by software.

Second Embodiment

Figure 3:
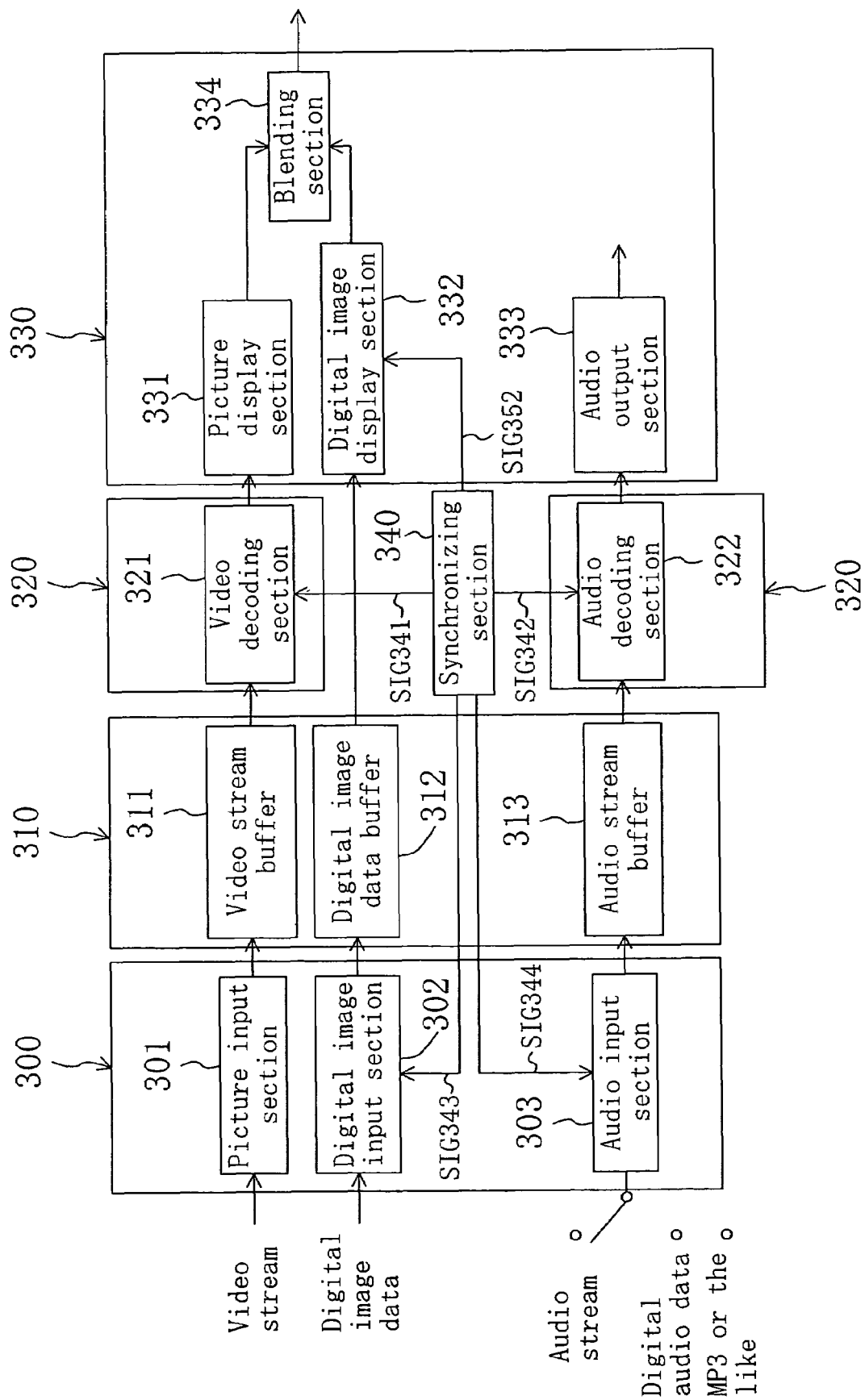
FIG. 3 is a block diagram illustrating a signal processor according to a second embodiment of the present invention.

FIG. 3 is a block diagram illustrating a signal processor according to a second embodiment of the present invention.

As shown in FIG. 3, the signal processor of this embodiment includes a digital input section 300, a data buffer 310, a decoding section 320, an output section 330 and a synchronizing section 340.

The digital input section 300 includes a picture input section 301, a digital image input section 302 and an audio input section 303.

The data buffer 310 includes a video stream buffer 311, a digital image data buffer 312 and an audio stream buffer 313.

The decoding section 320 includes a video decoding section 321 and an audio decoding section 322.

The output section 330 includes a picture display section 331, a digital image display section 332, an audio output section 333 and a blending section 334.

In the signal processor of this embodiment, the picture input section 301, the video stream buffer 311, the video decoding section 321, the picture display section 331, the digital image data buffer 312, the blending section 334, the audio stream buffer 313 and the audio output section 333 are the same as the picture input section 101, the video stream buffer 111, the video decoding section 121, the picture display section 131, the digital image data buffer 112, the blending section 134, the audio stream buffer 113 and the audio output section 133, respectively, which have been described in the first embodiment. The signal processor of this embodiment differs from the signal processor of the first embodiment in that time information is inserted at a time when the synchronizing section 340 receives the digital image data and the digital audio data, thereby synchronizing processing of the image data and processing of the audio data. Therefore, hereinafter, the configuration of the synchronizing section 340 and its method for synchronizing will be mainly described.

The digital image input section 302 receives as an input digital image data from an analog TV, a DVD, a network or the like. According to an instruction SIG343 of the synchronizing section 340, the digital image input section 302 superposes a VTC (video time code: picture time information) generated in the synchronizing section 340 on a signal in a vertical blanking period in each field or frame of the digital picture signal. The digital image input section 302 outputs data obtained by inserting the VTC into the digital image data to the digital image data buffer 312.

The audio input section 303 of the digital input section 300 receives digital audio data from an analog TV, a DVD player, a network or the like. According to an instruction SIG344 of the synchronizing section 340, the audio input section 303 inserts an ATC (audio time code: audio time information) generated in the synchronizing section 340 into the beginning of each frame of the digital audio signal. The audio input section 303 outputs data obtained by inserting the ATC to the digital audio data to the audio stream buffer 313.

Figure 4:
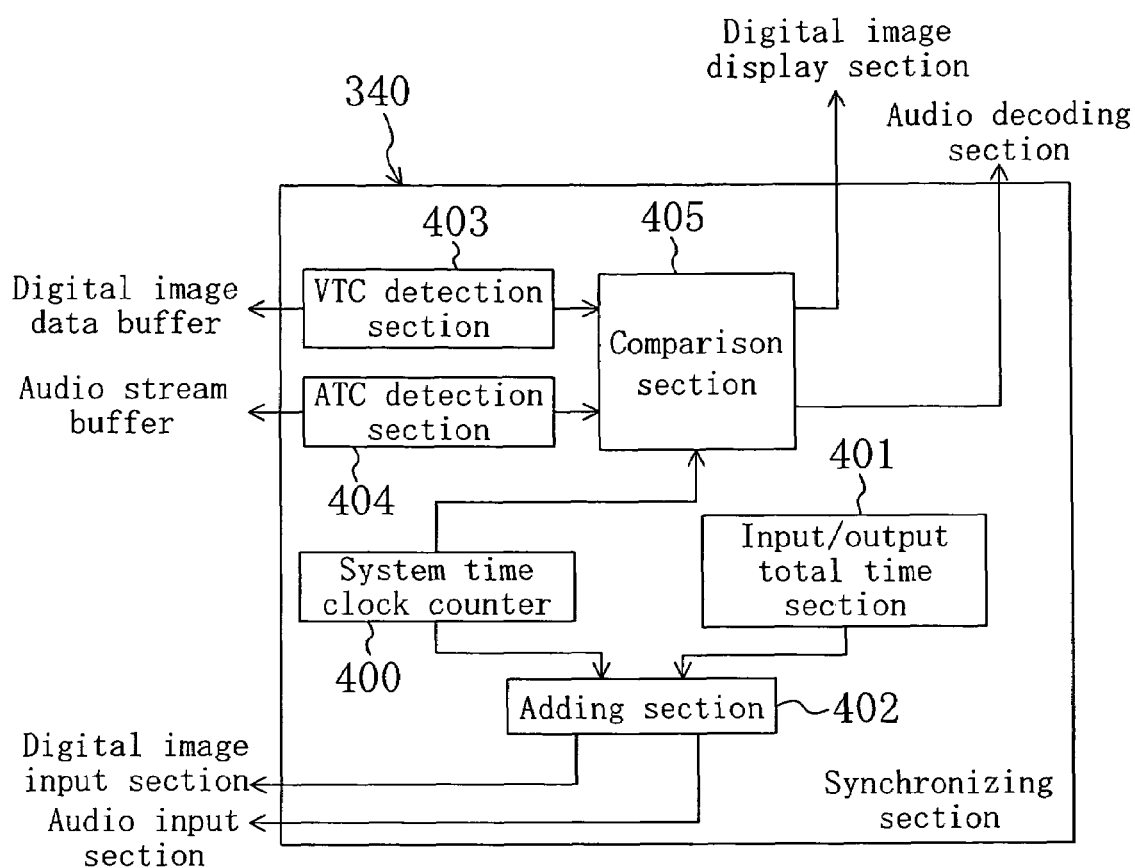
FIG. 4 is a block diagram illustrating the synchronizing section in the signal processor of the second embodiment.

Next, the configuration of the synchronizing section will be described. FIG. 4 is a block diagram illustrating the synchronizing section in the signal processor of this embodiment.

The synchronizing section 340 sends to the digital image input section 302 the instruction SIG343 for time information, inserts the VTC to the digital image data, sends to the audio input section 303 the instruction SIG344 for time information and the ATC is inserted to the digital audio data. Moreover, the synchronizing section 340 sends an instruction SIG341 for starting decoding to the video decoding section 321, an instruction SIG342 for starting decoding to the audio decoding section 322, and an instruction 352 for display to the digital image display section 332. Thus, the output of the video bit stream from the picture display section 331, the output of the digital image data from the digital image display section 332 and the output of the audio output section 333 are synchronized with one another.

Moreover, as shown in FIG. 4, the synchronizing section 340 includes a system time clock counter 400 for generating a reference time for a system, a VTC detection section 403 for detecting the VTC of the digital image data from the digital image data buffer 312, an ATC detection section 404 for detecting the ATC of the digital audio data from the audio stream buffer 313, a comparison section (second comparison section) 405 for comparing a VTC value obtained in the VTC detection section 403 with an output value from the system time clock counter 400, an input/output total time section (second input/output total time section) 401 for holding a total time from a time at which the video bit stream is received by the picture input section 301 specified beforehand to a time at which the video bit stream processed in the picture display section 331 is output, and an adding section 402.

The system time clock counter 400 is based on a system time clock (STC) and counts up a system time clock. A value obtained by this count-up is the reference time of a system.

Moreover, the total time that the input/output total time section 401 holds is output to the adding section 402.

The adding section 402 adds the output value of the input/output total time section 401 and the output value of the system time clock counter 400 (i.e., current time) to each other and obtains a result as a value for the VTC. Then, the adding section 402 sends to the digital image input section 302 an instruction for inserting the obtained VTC value into the digital image data of the digital image data buffer 312. In the same manner, the adding section 402 adds the output value of the input/output total time section 401 and the output value of the system time clock counter 400 to each other and obtains a result as a value for the ATC. The adding section 402 sends to the audio input section 303 an instruction for inserting the obtained ATC value into the digital audio data of the audio stream buffer 313.

Therefore, each of the VTC and the ATC is a time obtained by adding to the output of the system clock counter 400 a processing time which it takes to process the picture input section 301 to the picture display section 331. In this case, each of the VTC and the ATC may be "the output of the system clock counter 400+a time for processing the digital image data" or "the output value of the system clock counter 400+a time for processing the audio data". Note that the VTC is inserted, for example, into each vertical signal interval in the digital image data. The ATC is inserted, for example, into each predetermined sample of the digital audio data in each frame interval.

The VTC detection section 403 detects VTC of the digital image data held by the digital image data buffer 312 and then outputs the detected VTC to the comparison section 405. Moreover, the system time clock counter 400 outputs a count value to the comparison section 405.

The comparison section 405 compares the VTC value obtained in the VTC detection section 403 with the output value from the system time clock counter 400 and sends to the digital image display section 332, when a difference between the VTC value and the output value is smaller than a threshold, an instruction SIG352 for outputting digital image data. The threshold may be a threshold in field unit or frame unit, such as ±1/120 seconds or ±1/60 seconds, other than NTSC (National Television System Committee). Moreover, when a difference between the VTC value obtained in the VTC detection section 403 and the output value from the system time clock counter 400 becomes a larger time than the threshold, the comparison section 405 continues displaying the digital image data in the previous frame or the previous filed.

The ATC detection section 404 detects the ATC of the digital audio data held in the audio stream buffer 313 and then outputs the detected ATC to the comparison section 405. Moreover, the system time clock counter 400 outputs a count value to the comparison section 405.

The comparison section 405 compares the ATC value obtained in the ATC detection section 404 with the output value from the system time clock counter 400 and sends to the audio decoding section 322, when a difference between the ATC value and the output value becomes smaller than the threshold, the instruction SIG342 for outputting the digital audio signal data. The threshold may be a threshold in field unit or frame unit, such as ±1/120 seconds or ±1/60 seconds, other than NTSC. Moreover, when a difference between the ATC value obtained in the ATC detection section 404 and the output value of the system time clock counter 400 becomes larger than the threshold, the comparison section 405 stops the digital audio data so as not to output the sound.

Next, the flow of synchronization in the signal processor of this embodiment will be described with focus on the operation of the synchronizing section 340.

Figure 6:
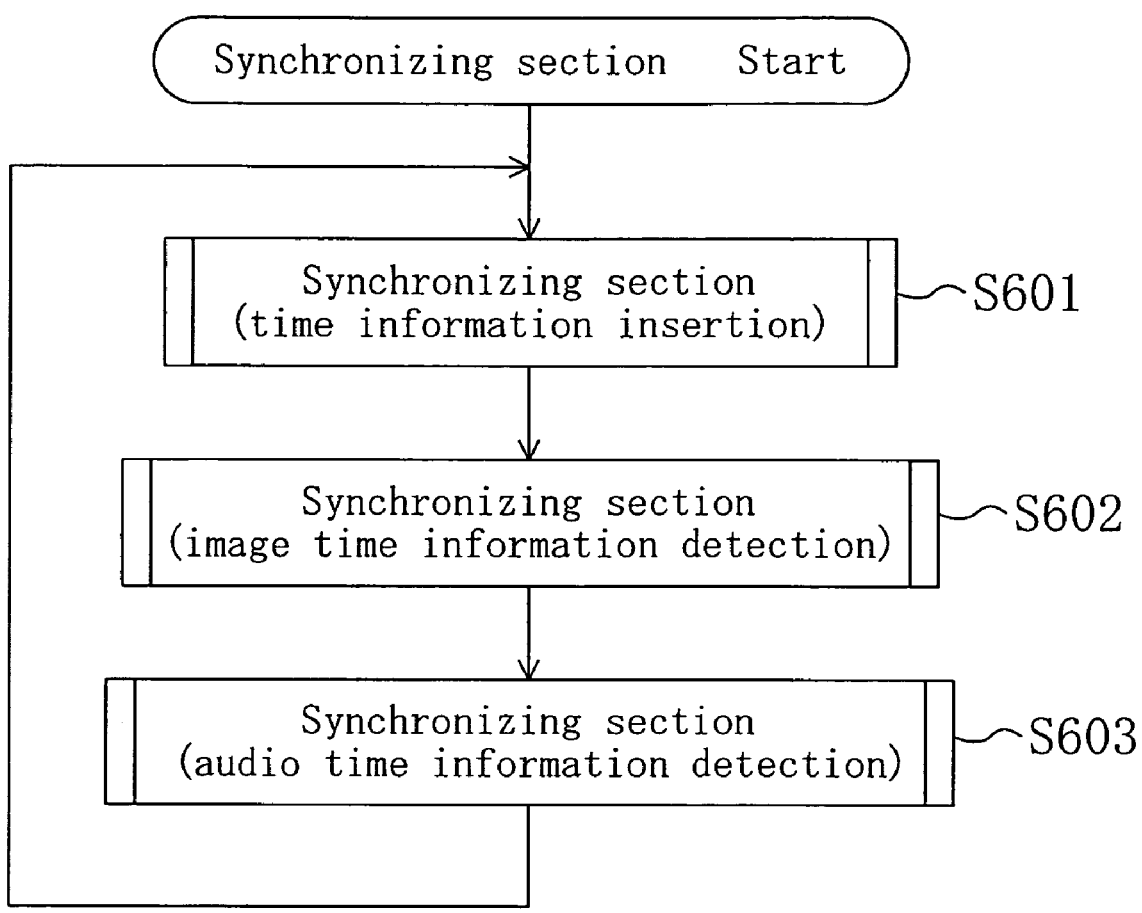
FIG. 6 is a flowchart showing the operation of the synthesizing section in the signal processor of the second embodiment.
Figure 7:
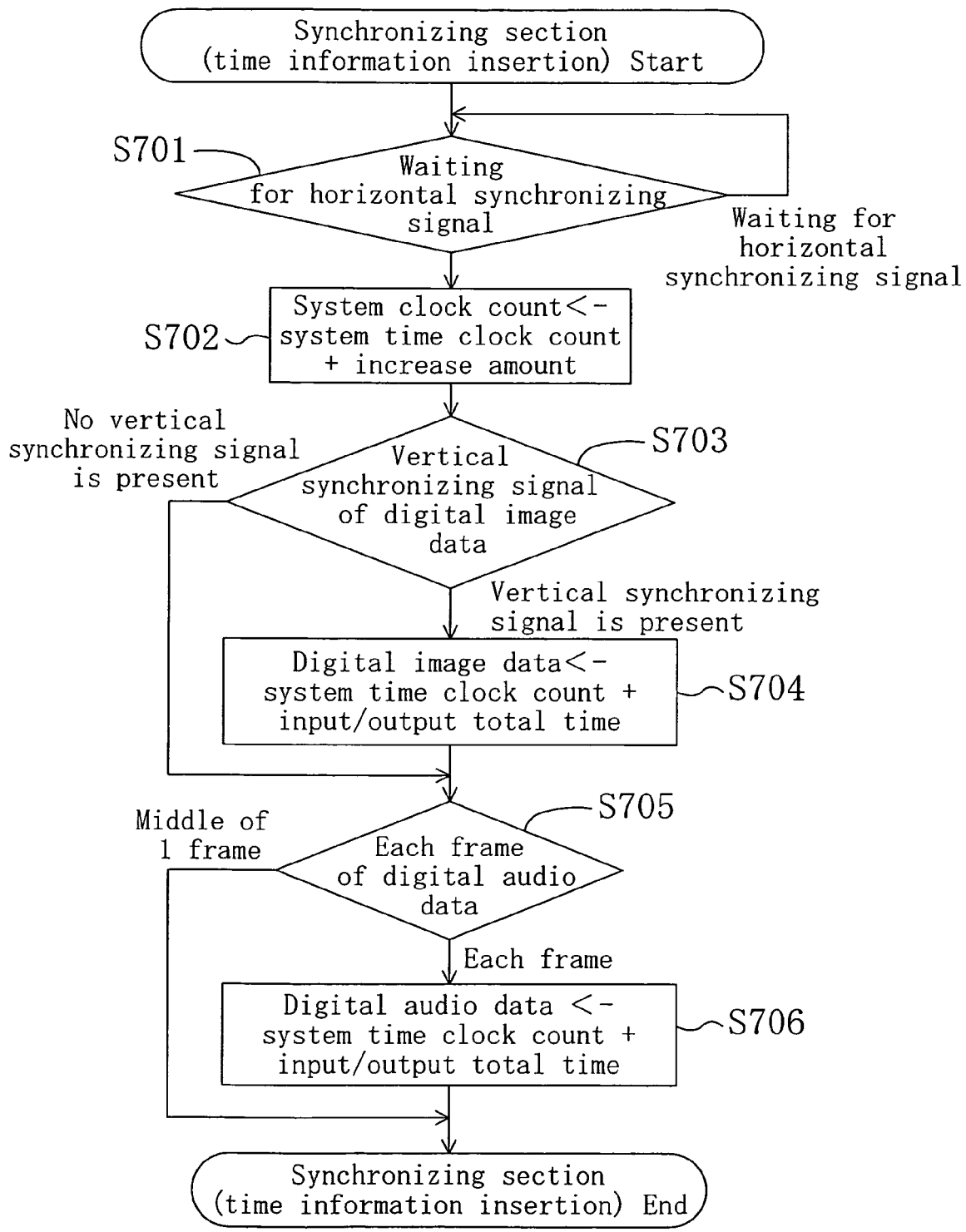
FIG. 7 is a flowchart illustrating details of each step of FIG. 6.
Figure 8:
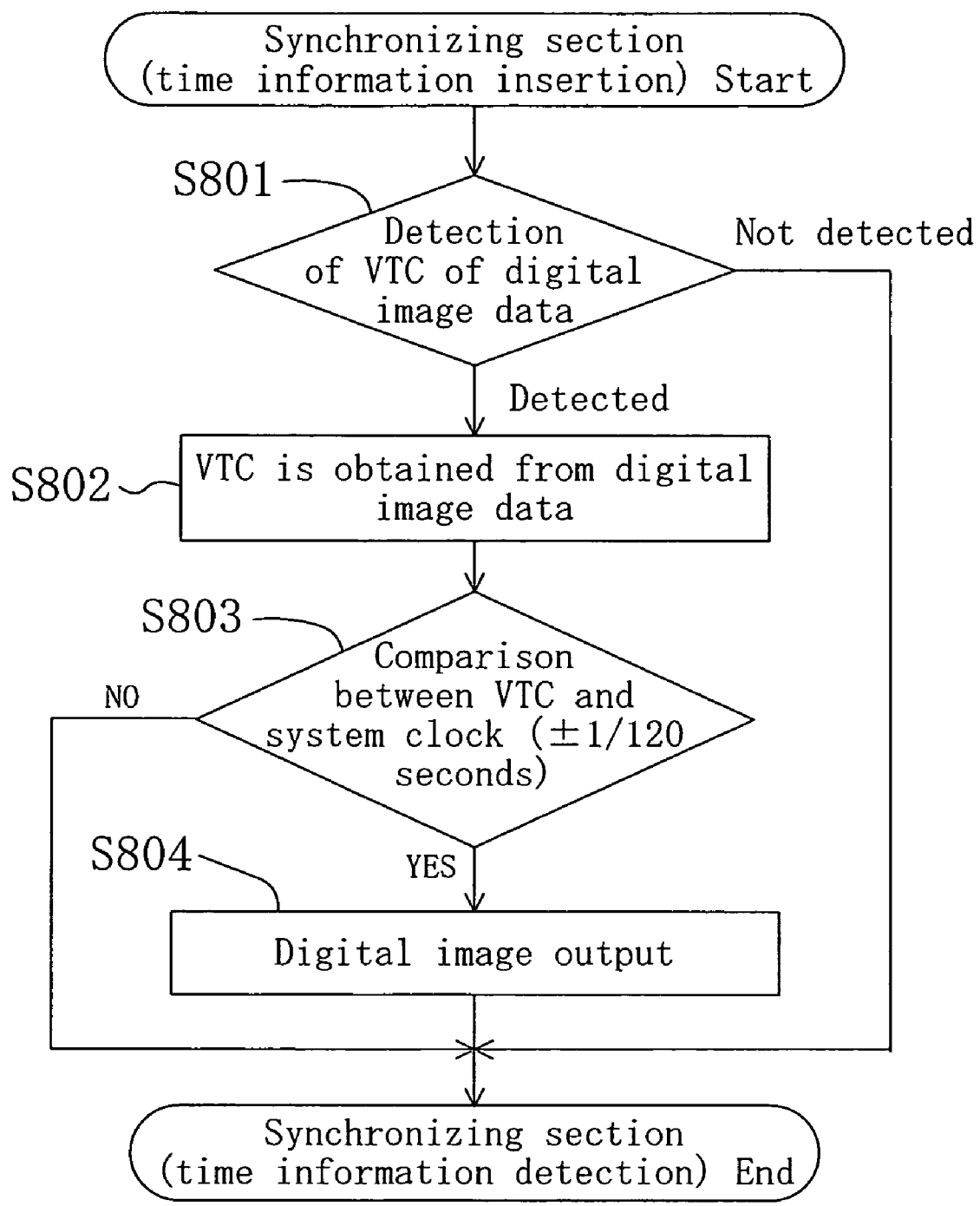
FIG. 8 is a flowchart illustrating details of each step of FIG. 6.
Figure 9:
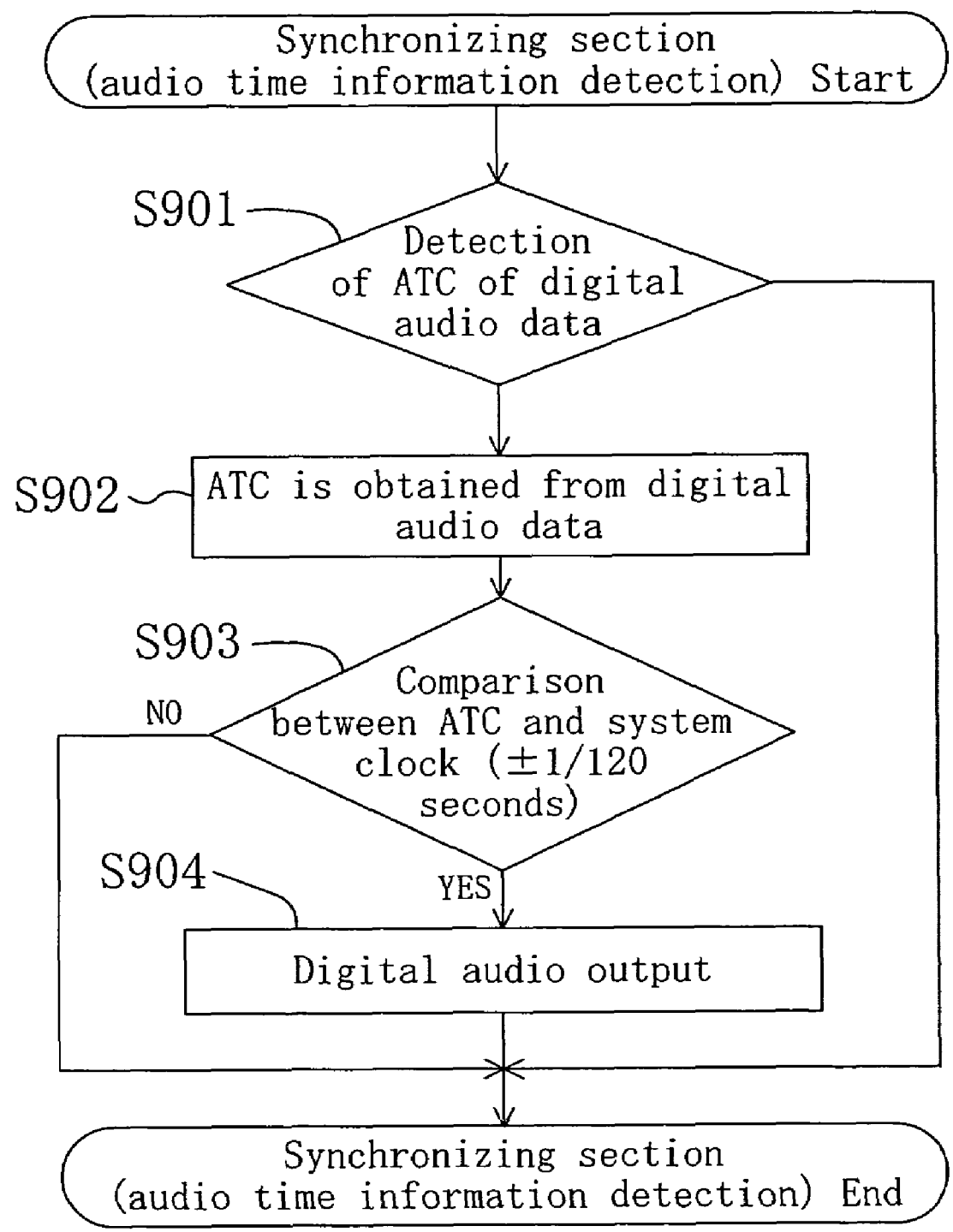
FIG. 9 is a flowchart illustrating details of each step of FIG. 6.
Figure 10:
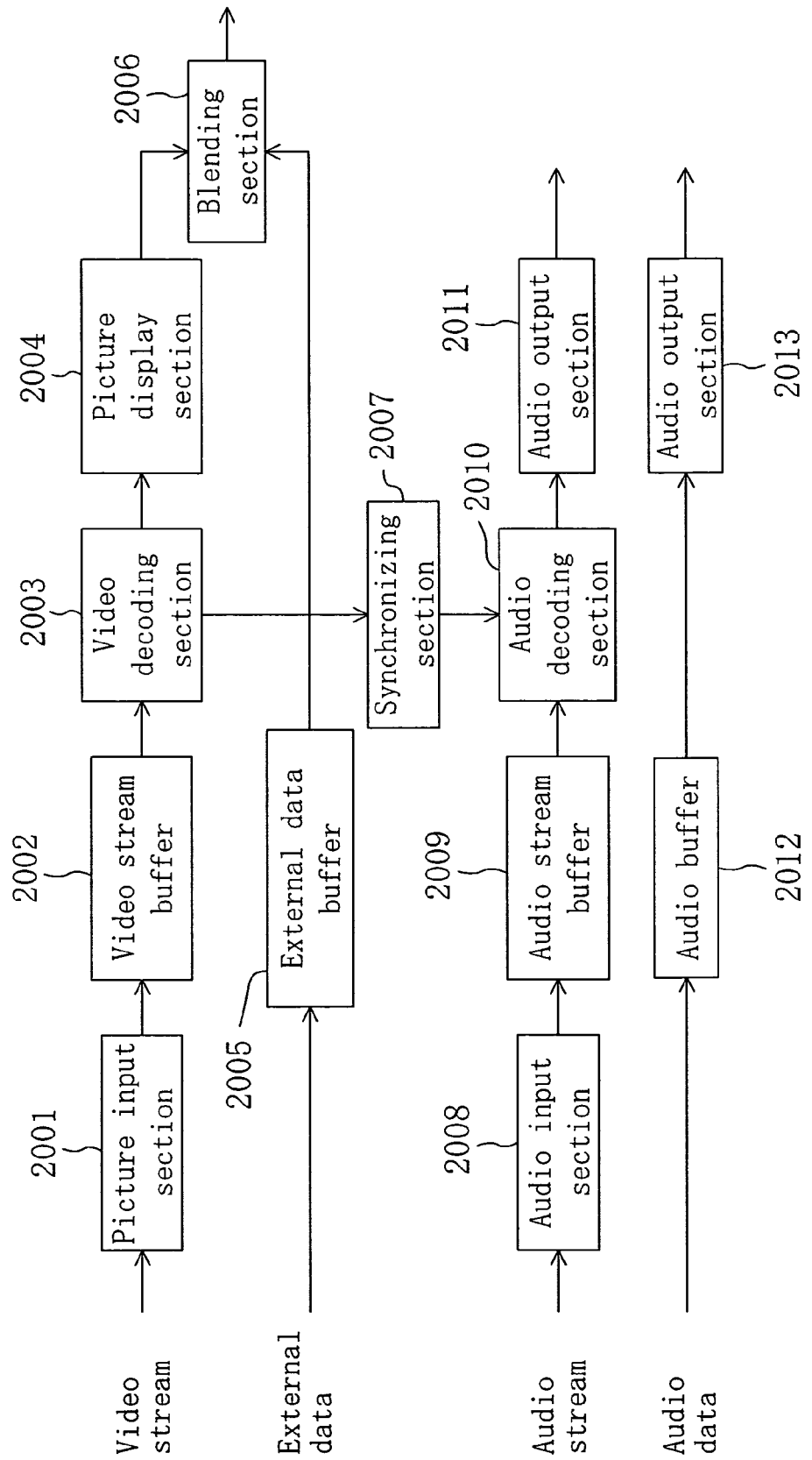
FIG. 10 is a block diagram illustrating a known signal processor.

FIG. 6 is a flowchart showing the operation of the synthesizing section in the signal processor of this embodiment. FIGS. 7, 8 and 9 are flowcharts illustrating respective steps of FIG. 6.

As shown in FIG. 6, synchronization in the synchronizing section 340 includes Step S601 of inserting time information into the digital image data and the digital audio data, Step S602 of detecting, from the digital image data held in the digital image data buffer 312, inserted time information, and Step S603 of detecting, from the digital audio data held in the audio stream buffer 313, inserted audio time information. Then, after Step S603, the step of inserting time information into a current filed of the digital image data and the digital audio data, i.e., Step S601 is performed.

Moreover, as shown in FIG. 7, above-described Step S601 includes Step S701, Step S702, Step S703, Step S705 and Step S706.

First, in Step S701, the synchronizing section 340 waits for a horizontal synchronizing signal of the digital image data. If a horizontal synchronizing signal is input to the synchronizing section 340 in the Step S701, the process proceeds with Step S702. If the horizontal synchronizing signal is not input, the synchronizing section 340 continues to wait for the horizontal synchronizing signal. Note that the horizontal synchronizing signal is a horizontal synchronizing signal of an output section.

Next, in Step S702, the system time clock counter 400 detects the horizontal synchronizing signal and then the system time clock counter 400 counts up a time corresponding to one display line.

Next, in Step S703, the system time clock counter 400 detects whether or not a vertical synchronizing signal exists in a display line of the date image data. If the vertical synchronizing signal is present, the process proceeds with Step S704. If the vertical synchronizing signal is not contained in the display line of the digital image data, the process proceeds with Step S705.

Next, in Step S704, a value obtained by adding the output value of the input/output total time section 401 to the output value of the system time clock counter 400 is inserted into the digital image data.

Subsequently, in Step S705, the digital audio data is judged in each frame of a sound. In Step S705, if the digital audio data is a boundary of a frame, the process proceeds with Step S706. If the digital frame data is not a boundary of a frame, Step S706 is not performed and the step of inserting time information (Step S601) is completed.

Next, in Step S706, a value obtained by adding the output value of the input/output total time section 401 to the output value of the system time clock counter 400 is inserted into the digital audio data. With the above-described steps performed, the Step S601 is completed.

Subsequently, in Step S602, the digital image data into which the time information has been inserted in Step S601 is detected.

As shown in FIG. 8, Step S602 includes Step S801, Step S802, Step S803 and Step S804.

First, in Step S801, detection of the time information inserted into the display line in Step S704 is performed to the digital image data. In this case, if the VTC detection section 403 finds the time information, the process proceeds with Step S802. If the VTC detection section 403 does not find the time information, Step S602 is completed.

Next, in Step S802, the time information (VTC) inserted into the digital image data in Step S704 is obtained. The time information is obtained in the Step S802, the process proceeds with Step S803.

Subsequently, in the Step S803, the output value of the system time clock counter 400 is compared with the VTC obtained in Step S802. For example, if a difference between the output value and the VTC is $1/120$ seconds or smaller, the process proceeds with Step S804. On the other hand, if the difference between the output value of the system time clock counter 400 and the VTC is, for example, larger than $1/120$ seconds, the digital image data $1/60$ seconds ago is output from the digital image display section 332. With the above-described steps performed, Step S602 is completed. Note that in this step, an image in the previous field is continuously displayed when the difference between the value of the system clock counter 400 and the VTC is larger than the threshold, so that distortion of the digital display can be suppressed when a synchronized state is no longer kept.

Next, in Step S804, current digital image data is output from the digital image display section 332. With the above-described steps performed, Step S602 is completed.

In Step S603 following Step S602, the time information inserted into the digital image data in Step S601 is detected.

As shown in FIG. 9, Step S603 includes Step S901, Step S902, Step S903 and Step S904.

First, in Step S901, detection of the time information (ATC) inserted into each audio frame is performed to the digital audio data. In this case, if the ATC is detected by the ATC detection section 404, the process proceeds with Step S902. If the ATC is not detected, Step S603 is completed.

Next, in Step S902, the ATC inserted into the digital audio data in Step S706 is obtained.

Subsequently, in Step S903, the ATC obtained in Step S902 is compared with the count value in the system time clock counter 400. If a difference between the ATC and the count value in the system time clock counter 400 is, for example, $1/120$ seconds or smaller, the process proceeds with Step S904. If the difference between the ATC and the count value in the system time clock counter 400 is larger than $1/120$ seconds, a digital sound is not output.

Next, in Step S904, the current digital audio data is output from the audio output section 333. With the above-described steps performed, Step S603 is completed.

With the signal processor of this embodiment, as has been described, the synchronizing section 340 inserts the time information into each of the digital image data and the digital audio data, so that the process of the digital image data and the process of the digital audio data can be delayed or other methods can be performed. Thus, the respective outputs of the digital image display section 332 and the audio output section 333 can be synchronized with the output of the picture display section 331. As a result, an excellent image display can be achieved. Moreover, a lag between an image and a sound can be avoided. Specifically, in the signal processor of this embodiment, compared to the signal processor of the first embodiment, the picture display section 331 and the digital image display section 332 which are located closer to the side from which the image data is output can be synchronized with each other. Thus, a display of the digital image data and a display of the video bit stream can be synchronized with higher accuracy. Moreover, the display of image data and an output of the audio data can be synchronized with higher accuracy.

Note that a CPU may be used to make software perform the above-described process steps in the signal processor.

Moreover, in the signal processor according to the present invention, signal processing can be performed even when each of the digital image data and the digital audio data is data read out from a recording medium such as a DVD (digital versatile disc), a CD (compact disk) and a hard disk.

Note that in the signal processor of this embodiment, a selector may be provided in the previous stage to the audio input section 303 so that when a plurality of types of digital audio data are input, only one digital audio data is received.

Note that the VTC and the ATC can be detected by some other method than the method described in this embodiment. Based on the method, synchronization can be performed.

What is claimed is:

1. A signal processor comprising:
a digital input section for separately receiving an encoded video bit stream, digital image data, an encoded audio bit stream and digital audio data;
a data buffer capable of holding the encoded video bit stream, the digital image data, the encoded audio bit stream and the digital audio data, each being separately output from the digital input section;
a decoding section including a video decoding section for receiving the encoded video bit stream held in the data buffer and outputting the decoded video bit stream and an audio decoding section for receiving the digital audio data and the encoded audio bit stream and outputting the digital audio data and the decoded audio bit stream;
a synchronizing section for controlling an operation of the audio decoding section to synchronize an output of the encoded audio bit stream, an output of the digital audio data and a display of the digital image data; and an output section including:
- a picture display section for receiving the decoded video bit stream and outputting the decoded video bit stream as display data,
- a digital image display section for receiving the digital image data held in the data buffer and outputting the digital image data as display data, and
- an audio output section for outputting the decoded audio bit stream and the digital audio data, wherein the synchronizing section synchronizes an output of the digital image display section and an output of the audio output section, wherein the digital input section includes a picture input section for receiving the encoded video bit stream and a digital image input section for receiving the digital image data, and wherein the synchronizing section includes an input detection section for detecting an input of the digital image data into the digital image input section, a counter section for counting an elapsed time from a time at which the input detection section detects the input of the digital image data, a first input/output total time section for holding a time difference between a first total time, i.e., a required total time from a time at which the digital image data is received by the digital image input section to a time at which the digital image data is output from the digital image display section and a second total time, i.e., a required total time from a time at which the digital audio data is received by the audio decoding section to a time at which the digital audio data is output from the audio output section, and a first comparison section for making, if the time difference between the first and second total times and a count value of the counter section are judged equal to each other, the audio decoding section start decoding of the audio bit stream.

2. The signal processor of claim 1, wherein if an absolute value of a difference between the time difference between the first and second total times and the counter value of the counter section is $1/60$ seconds or smaller, the first comparison section makes the audio decoding section start decoding of the audio bit stream.

3. The signal processor of claim 1, wherein the audio decoding section does not output the digital audio data received by the audio input section to the audio output section until decoding is started according to an instruction from the first comparison section.

4. The signal processor of claim 1, wherein the audio input section does not output the digital audio data to the audio output section until the first comparison section gives an instruction for starting decoding.

* * * * *